US010011518B2

(12) United States Patent
Badeke et al.

(10) Patent No.: US 10,011,518 B2
(45) Date of Patent: Jul. 3, 2018

(54) EVAPORATOR AND METHOD FOR PRODUCING SYNTHETIC FUSED QUARTZ

(71) Applicant: Heraeus Quarzglas GmbH & Co. KG, Hanau (DE)

(72) Inventors: Klaus-Uwe Badeke, Petersberg-Sennewitz (DE); Martin Trommer, Bitterfeld (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 14/893,705

(22) PCT Filed: Mar. 12, 2014

(86) PCT No.: PCT/EP2014/000660
§ 371 (c)(1),
(2) Date: Nov. 24, 2015

(87) PCT Pub. No.: WO2014/187513
PCT Pub. Date: Nov. 27, 2014

(65) Prior Publication Data

US 2016/0107923 A1 Apr. 21, 2016

(30) Foreign Application Priority Data

May 24, 2013 (DE) ........................ 10 2013 209 673

(51) Int. Cl.
*C03B 37/014* (2006.01)
*B01B 1/00* (2006.01)
(Continued)

(52) U.S. Cl.
CPC ................ *C03C 3/06* (2013.01); *B01B 1/005* (2013.01); *B01J 19/26* (2013.01); *C01B 33/12* (2013.01);
(Continued)

(58) Field of Classification Search
None
See application file for complete search history.

(56) References Cited

U.S. PATENT DOCUMENTS 3,969,449 A * 7/1976 Shires ...................... B01D 1/14 261/153
4,212,663 A * 7/1980 Aslami ............. C03B 37/01413 118/724
(Continued)

FOREIGN PATENT DOCUMENTS

CN 1261329 7/2000
EP 0719575 7/1996
(Continued)

OTHER PUBLICATIONS

PubChem, Octamethylcyclotetrasiloxane Compound Summary PubChem, https://pubchem.ncbi.nlm.nih.gov/compound/octamethylcyclotetrasiloxane#section=Top, Feb. 12, 2017.*
(Continued)

*Primary Examiner* — Lisa L Herring
(74) *Attorney, Agent, or Firm* — Dicke, Billig & Czaja, PLLC

(57) ABSTRACT

A method for manufacturing quartz glass, wherein (a) an appropriate liquid starting material is evaporated by spraying it into a vertically arranged evaporation chamber, (b) the vaporous starting material is oxidized to form $SiO_2$, and the $SiO_2$is collected. The method is characterized in that the starting material to be evaporated is sprayed in on the bottom of the evaporation chamber and the vaporous starting material is removed at the top end of the evaporation chamber, wherein the evaporation chamber is designed such that components depositing in the chamber accumulate on the bottom of the evaporator and are sprayed once again, as well as an evaporator for applying the method.

17 Claims, 5 Drawing Sheets

(51) Int. Cl.

| | |
|---|---|
| ***B01D 1/06*** | (2006.01) |
| ***C03C 3/06*** | (2006.01) |
| ***C03B 19/14*** | (2006.01) |
| ***B01J 19/26*** | (2006.01) |
| ***C01B 33/12*** | (2006.01) |

(52) U.S. Cl.

CPC .... *C03B 19/1415* (2013.01); *C03B 37/01413* (2013.01); *B01J 2219/24* (2013.01); *C03B 2207/20* (2013.01); *C03B 2207/32* (2013.01); *C03B 2207/34* (2013.01); *C03B 2207/85* (2013.01); *C03B 2207/87* (2013.01)

(56) References Cited

U.S. PATENT DOCUMENTS

| | | | | | |
|---|---|---|---|---|---|
| 5,043,002 | A | | 8/1991 | Dobbins et al. | |
| 5,356,451 | A | | 10/1994 | Cain et al. | |
| 5,372,754 | A | * | 12/1994 | Ono | B01F 3/022 118/726 |
| 5,632,797 | A | * | 5/1997 | Williams | B01D 1/22 118/726 |
| 5,641,124 | A | * | 6/1997 | Bringfors | B01D 53/504 239/290 |
| 5,779,804 | A | * | 7/1998 | Mikoshiba | C23C 16/20 118/715 |
| 5,879,649 | A | | 3/1999 | Henderson et al. | |
| 6,079,225 | A | | 6/2000 | Ruppert et al. | |
| 6,312,656 | B1 | | 11/2001 | Blackwell et al. | |
| 2003/0234455 | A1 | | 12/2003 | Mieney et al. | |
| 2006/0096326 | A1 | * | 5/2006 | Saitou | C03B 37/0142 65/413 |
| 2012/0276291 | A1 | | 11/2012 | Bird et al. | |
| 2013/0205832 | A1 | * | 8/2013 | Miyasaka | C03B 20/00 65/21.1 |
| 2014/0120018 | A1 | * | 5/2014 | Berger | B01D 53/70 423/245.1 |

FOREIGN PATENT DOCUMENTS

| | | | | | |
|---|---|---|---|---|---|
| GB | 1508813 | A | * | 4/1978 | B01D 1/16 |
| JP | 8-131812 | | | 5/1996 | |
| JP | 11-49522 | | | 2/1999 | |
| WO | 9903781 | | | 1/1999 | |
| WO | 2013087751 | | | 6/2013 | |

OTHER PUBLICATIONS

The International Search Report and Written Opinion for International Application No. PCT/EP2014/000660 dated Jun. 11, 2014 (13 pages).

* cited by examiner

EVAPORATOR AND METHOD FOR PRODUCING SYNTHETIC FUSED QUARTZ

CROSS REFERENCE TO RELATED APPLICATION

This Utility Patent Application claims the benefit of the filing date of German Application No. DE 10 2013 209 673.9, filed May 24, 2013, and International Application No. PCT/EP2014/000660, filed March 12, 2014, both of which are herein incorporated by reference.

BACKGROUND

One embodiment of the invention relates to a method for manufacturing quartz glass as well as to an evaporator adapted to this method.

To manufacture high-purity synthetic quartz glass, use is made of halogen-containing and non-halogen silicon compounds as starting materials. Halogen-containing feed materials, such as silicon tetrachloride (SiCl4) are to disadvantage in that corrosive acids, e.g., hydrochloric acid (HCl), are produced as side products when they are used. For this reason, use is increasingly made of non-halogen materials wherein, presently, alkyl polysiloxanes are at the center of interest.

According to U.S. Pat. No. 5,043,002, polymethyl cyclosiloxanes such as hexamethyl cyclotrisiloxane (HMCTS), octamethyl cyclotetrasiloxane (OMCTS) and decamethyl cyclopentasiloxane (DMCTS), are particularly adapted to manufacture high-purity silicon dioxide for optical fibres. The siloxanes are oxidized in a burner flame in the presence of oxygen to obtain SiO2 which accumulates in the form of fine amorphous particles that are referred to as silica soot. The $SiO_2$ soot is collected and melted to form a glass which can be used as starting material for fibre-optic blanks or for optical components.

U.S. Pat. No. 5,356,451 discloses evaporators which are supposed to be adapted to evaporate halogen-containing and non-halogen silicon compounds. The liquid to be evaporated is applied to an inclined surface in a thin layer. The surface is heated, with the result that the liquid evaporates while it flows down the surface.

Polymethyl cyclosiloxanes are to disadvantage in that they tend to form resins and gels which result in the contamination of heat exchanger surfaces and burners as well as in the clogging of pipelines. For example, resins and gels are formed while the hydrolytic opening of the cyclic alkyl polysiloxanes to form linear hydroxyl-terminated siloxanes (silanols) is in progress, which have a considerably lower volatility than the cyclic compounds and deposit in the system. The silanols are reactive and react with cyclosiloxane molecules to form gel-like polymerisation products. It is also possible that silanol traces are contained as contaminants in the starting material.

EP 0 719 575 A2 discloses an evaporator for non-halogen silicon compounds, wherein gels are collected in a sump in order to prevent contamination of evaporator surfaces and clogging of the pipelines. The evaporator comprises a vertically aligned evaporation chamber into which the substances to be evaporated are sprayed. Due to the pressure drop, a part of the pre-heated liquid evaporates when it enters the evaporator, while another part evaporates when it impinges on the heater evaporator walls. The gels formed during evaporation are collected in the lower part of the evaporator and removed periodically. The nozzles for spraying the liquid are arranged such that they do not carry along the gels having accumulated in the sump of the evaporator.

According to U.S. Pat. No. 6,312,656, the formation of gels is supposed to be prevented in that the alkyl polysiloxanes are not evaporated but are directly sprayed into the burner flame in liquid form. The temperature load associated with evaporation and favouring the formation of gels is prevented in this manner.

U.S. Pat. No. 5,879,649 discloses alkyl polysiloxanes having a boiling point of less than 250° C., the alkyl polysiloxanes containing less than 14 ppm of high boiling contaminants having boiling points in excess of 250° C. These contaminants can be evaporated only poorly due to their high boiling points and accumulate in the evaporator where they react to form gel-like deposits. The alkyl polysiloxanes are purified by distillation and subsequent filtration of the distillate through activated charcoal and molecular sieves.

US 2012/0276291 discloses a method for evaporating alkyl polysiloxanes according to which the liquid to be evaporated is directed to the vertical walls of an evaporation chamber. The walls of the evaporation chamber are heated to such a high temperature that a part of the liquid evaporates. The remaining liquid flows along the walls and to the bottom of the chamber where it is removed continuously. Gels formed in the evaporator are rinsed out of the chamber along with this liquid.

Despite numerous efforts, the formation of gel is still a severe problem in the manufacture of high-purity quartz glass. The gels can concentrate in the evaporator and in the pipelines and impair the process stability. This is particularly applicable for the manufacture of glass fibres because, here, minute irregularities considerably impair the further processing of the glass blank to form fibres. In addition, the purification of the starting materials and the cleaning of evaporators and units are subject to substantial effort.

BRIEF DESCRIPTION OF THE DRAWINGS

The accompanying drawings are included to provide a further under-standing of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

Figure 1:
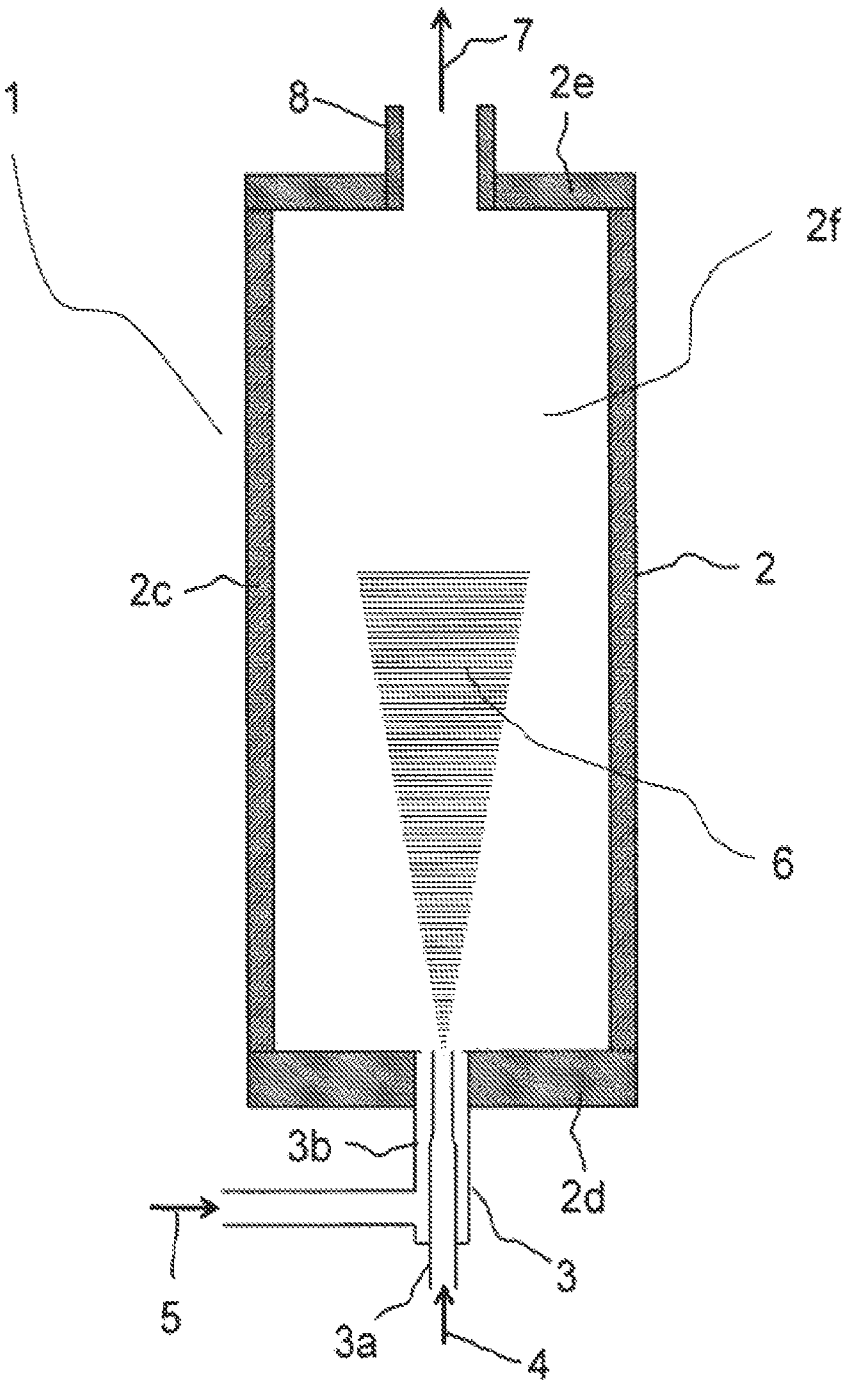
FIG. 1 is a sectional view of an evaporator according to one embodiment.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

One embodiment of the invention is based on the object to provide an evaporator and a method for manufacturing quartz glass with which the aforementioned drawbacks can be obviated. In particular, the efforts associated with the cleaning of evaporators and units as a result of the gel formation are to be minimised as far as possible.

According to the one embodiment of the invention, this object is solved by a method for manufacturing quartz glass according to which (a) an appropriate liquid starting material is evaporated by spraying it into a vertically arranged evaporation chamber of an evaporator, (b) the vaporous starting material is oxidized to form $SiO_2$, and (c) the $SiO_2$ is collected, wherein the method is characterized in that the starting material to be evaporated is sprayed in on the bottom of the evaporation chamber and the vaporous starting material is removed at the top end of the evaporation chamber, wherein the evaporator is designed such that components depositing in the chamber accumulate on the bottom of the evaporator and are sprayed once again.

The $SiO_2$ accumulated in step (c) is, preferably, dried in a further method step (d) to form a glass blank and subjected to a heat treatment for glazing purposes in step (e). Subsequently, the blank can be further processed in step (f), e.g. to form glass fibres.

Substances that are possible as liquid starting materials are substances that are tending to form gels by polymerisation and adapted to manufacture $SiO_2$. Preferred are polymethyl cyclosiloxanes, more particularly hexamethyl cyclotrisiloxane (D3), octamethyl cyclotetrasiloxane (D4), decamethyl cyclopentasiloxane (D5), or dodecamethyl cyclohexasiloxane (D6). A most preferred starting material is octamethyl cyclotetrasiloxane (OMCTS; D4). The abbreviations D3, D4, D5, etc. are names the company General Electric introduced for siloxanes, wherein D stands for the group $[(CH_3)_2Si]—O—$.

In general, it is preferred to use the particular starting material in a form that is as pure as possible because the evaporation process is adjusted to the boiling point of the starting material. The starting material may contain minor amounts of components having a higher or a lower boiling point. For example, the octamethyl cyclotetrasiloxane (OMCTS; D4) that is preferred according to one embodiment of the invention may contain up to 2 weight per cent of D3 and/or up to 5 weight per cent of D5. The content of higher-molecular compounds, such as D7, D8, D9, etc. is, preferably, not in excess of 30 to 100 ppm.

The temperature in the evaporation chamber is adjusted to the starting material and, in case of OMCTS (boiling point 171° C. to 175° C.; unless otherwise specified, all data herein relate to normal pressure), is preferably within a range from 130° C. to 230° C., more preferably from 140° C. to 190° C., and most preferably from 150° C. to 180° C.

Preferably, the starting material is sprayed into the evaporation chamber along with a carrier gas. Preferably, the carrier gas used is an inert gas, more particularly nitrogen. It is, however, also possible to use oxygen as carrier gas or to admix oxygen to the carrier gas, the oxygen being required for later oxidation of the alkyl polysiloxanes.

Preferably, the molar ratio of starting material to carrier gas is within a range from 0.01 to 2, more preferably from 0.05 to 1, and most preferably from 0.1 to 0.75. Among other things, this facilitates the evaporation of higher boiling polymethyl cyclosiloxanes in the starting material, for example of D7 (boiling point 276° C.).

Preferably, the carrier gas has a water content of no more than 30 ppm by volume, more preferably less than 10 ppm by volume.

The vaporous alkyl polysiloxane or, rather, the mixture of carrier gas and vaporous alkyl polysiloxane is removed at the top end of the evaporation chamber and supplied into a burner. Before it is introduced into the burner, the vaporous material or, rather, the mixture of vaporous material and carrier gas is, preferably, mixed with oxygen. In the burner, the alkyl polysiloxane is oxidized to form $SiO_2$. This results in the formation of fine amorphous $SiO_2$ ($SiO_2$ soot) which is deposited in the form of a porous mass. In order to ensure complete oxidation of the alkyl polysiloxane, further oxygen is, preferably, supplied in the burner. The supply can be achieved via separate nozzles.

According to an alternative embodiment, the vapour or, rather, the mixture of vapour and carrier gas and the oxygen are separately supplied to the burner and are not mixed before they are in the burner.

Preferably, the burner is additionally charged with a combustion fuel, preferably with methane and more preferably with hydrogen the combustion of which results in an igniting flame into which the vapour or, rather, the mixture of vapour and carrier gas is introduced.

The $SiO_2$ soot is deposited on a suitable deposition surface, preferably on a rotating carrier pipe. Herein, a porous $SiO_2$ body is obtained which is also referred to as soot body. The soot body is dried in step (d) and converted into a quartz glass blank by means of a subsequent temperature treatment (e). Preferably, drying is achieved at a temperature of 800° C. to 1100° C. Thereafter, the dried soot body is glazed by heating up to a temperature within a range from 1400° C. to 1500° C., i.e. sintered to obtain a glass blank. Preferably, the porous $SiO_2$ body is dried in an atmosphere consisting of chlorine gas and an inert gas; preferably, sintering takes place in an inert gas atmosphere, more preferably in a vacuum. In either case, helium or nitrogen is preferred as inert gas. Subsequently, the glass blank can be further processed, for example, by drawing it to obtain glass fibres.

Furthermore, the object of one embodiment of the invention is an evaporator for applying the method, the evaporator comprising a vertically aligned evaporation chamber (2) that is limited by walls 2*c*, 2*d* and 2*e*, an atomizing nozzle (3) that is arranged on the bottom of the evaporator and serves to spray the liquid starting material (4) into the evaporation space (2*f*), and an outlet (8) that is arranged at the top end of the evaporator, wherein the evaporator is designed such that components depositing in the chamber accumulate on the bottom of the evaporator and are sprayed once again.

When alkyl polysiloxanes are evaporated, it is practically not possible to completely suppress the formation of gels and resin-like contaminants. In order to avoid operational disorders caused by deposits in the unit and to prevent quality from being impaired while the quartz glass is being manufactured, it is, therefore, indispensable to separate such contaminants from the vapour flow. According to one embodiment of the invention, gels and resin-like contaminants are retained in the evaporator.

FIG. 1 is a sectional view of an evaporator 1 preferred according to one embodiment of the invention, comprising a cylindrical evaporation chamber 2. The evaporation chamber 2 is limited by a lateral surface 2*c*, a bottom plate 2*d* and a cover 2*e*. Within the chamber, there is a free evaporation space 2*f*. The evaporator shown in FIG. 1 comprises a two-substance spray nozzle 3 which is arranged on the bottom of the evaporator. The nozzle 3 has an inner nozzle 3*a* and an outer nozzle 3*b* which surrounds the inner nozzle like a ring. The liquid starting material 3 is supplied to the inner nozzle 3*a* and the carrier gas 5 is supplied to the outer nozzle 3*b*. The carrier gas and the feed material are sprayed to form a spray mist 6. The liquid is sprayed into the evaporation space 2*f* in a vertical upward direction. In the embodiment shown, the carrier gas 5 and the liquid 4 to be evaporated are sprayed in to the chamber 2*f* in the form of a mist, based on the hydraulic pressure principle. At the top end of the evaporator, a mixture 7 consisting of the vaporous feed material and the carrier gas is removed through the outlet 8.

Non-evaporated contents of the feed material and condensates formed in the evaporator stay behind when the volatile components are evaporated and drop to the bottom or they deposit on the chamber walls and flow down along the latter as long as they are capable of flowing at the evaporator temperature. As a result of gravity, these residues accumulate on the bottom of the chamber.

An essential aspect of the method according to one embodiment of the invention is that the residues which have accumulated on the chamber bottom are sprayed once again. Preferably, they are carried along by the inflowing gas flow and, therein, distributed in the evaporation chamber in the form of fine droplets. Additional nozzles may be provided for spraying the deposits, e.g., nozzles which are charged with carrier gas. As a result of the repeated spraying, vaporisable contents in the residues, such as condensing starting material, can evaporate in the spray cone and be supplied to the burner. In this manner, the quantity of deposits in the chamber is reduced.

Components the boiling point of which is so high that they do not evaporate under the conditions present in the evaporator once more deposit and accumulate on the walls and the bottom of the chamber. Usually, these components are high-molecular compounds which are formed by ring opening and polymerisation from cyclic alkyl polysiloxanes. Primarily, the polymerisation is initiated by contaminants which are contained in the liquid feed material. These are, above all, silanols, water, bases, acids, and chlorides. The presence of such contaminants cannot be avoided from a technical point of view. Initially, the deposits have a viscous consistency and are capable of flowing under the evaporator conditions. The repeated spraying of these gels favours a further reaction of the polymerisation products, with the result that the molecular weight thereof increases. Herein, the flowability of the compounds decreases naturally and finally becomes so excessive that, after having deposited on the walls, the deposits cannot flow to the bottom of the chamber any longer. Therefore, the method according to one embodiment of the invention is characterized in that the flowable contents are circulated as long as necessary until they assume a rubber-like consistency by repeated reaction and become immobile (immobile residues).

As a result of this process, a high-viscosity polymer layer is formed on the walls and bottoms of the evaporation chamber during ongoing operation. It has turned out that this layer does not disturb the evaporation process and that the evaporator can be operated without interruption over long time periods despite the formation of this layer. The rubber-like polymers are inert to a large extent. They can remain in the evaporator and be removed within the scope of maintenance and testing work that is required anyway. Using an evaporator according to one embodiment of the invention, it was possible to evaporate more than 8 tons of OMCTS with an evaporator volume of approx. 10 liters without noteworthy deposits forming in the evaporator. The mean thickness of the polymer layer was less than 70 μm. The formation of a sump was not observed.

In contrast to the immobile residues, the residues that are capable of flowing at the evaporator temperatures (mobile residues) still contain reactive components and can continue to polymerise. These mobile residues are continuously reformed while the alkyl polysiloxanes are evaporated.

It has become apparent that the content of resins and gels in the vapour phase removed at the top end of the chamber is astonishingly low. It is assumed that this is to be attributed to the spraying of the mobile residues. These mobile residues contain linear hydroxyl-terminated siloxanes which can react with contaminants. By spraying the mobile residues in the form of small droplets, the surface thereof is enlarged and the contact with the incoming gas flow is improved. Contaminants present in the gas flow are absorbed by the droplets and bound by reaction.

Ultimately, the contaminants are deposited in the evaporator in the form of a high-viscosity immobile polymer layer. Since this layer does not impair the evaporation process, the evaporator can be operated without interruption over long time periods. To further prolong the uninterruptible operating time, the evaporator can be provided with built-in components which enlarge the inner surface and, therefore, the deposition surface of immobile deposits. Preferably, the built-in components have the form of plates or discs which can be inserted into the evaporator. The size and shape of the plates and discs are adjusted to the size and shape of the evaporator. Plates or discs that can be placed on intermediate bottoms of the evaporator are particularly preferred. For example, metal lattices or screens are advantageous, e.g. made of expanded metal.

The evaporator according to one embodiment of the invention allows providing high-purity vaporous alkyl polysiloxanes which can be easily processed to obtain $SiO_2$ bodies. After having been dried and thermally treated, the $SiO_2$ bodies result in faultless glass blanks which are particularly suitable for manufacturing glass fibres. By means of the method according to one embodiment of the invention, the amount of deposits in the evaporator is minimised and, at the same time, the purity of the vaporous alkyl polysiloxanes is maximised.

Preferably, the spraying of the starting materials into the evaporator is controlled such that a large part of the liquid evaporates without coming into contact with the walls of the evaporation chamber. Preferably, the alkyl polysiloxanes are sprayed through single-substance nozzles or, more preferably, two-substance nozzles which are arranged on the bottom of the evaporation chamber and spray the liquid into the free chamber in a vertical upward direction. Therein, the spray cone is configured such that any wall contact of the droplets is minimised. The liquid to be evaporated is atomized to form droplets that are as small as possible. Preferably, the mean droplet size (mean volumetric diameter of the droplets) is within a range from 5 pm to 200 pm, more preferably from 10 pm to 150 pm, and most preferably from 20 pm to 100 pm. The formation of a fine spray mist allows achieving fast evaporation of the liquid and preventing a high temperature load on the liquid starting material. In the flight phase, the droplets take up heat from the evaporator and largely evaporate without any wall contact. The remaining liquid evaporates during contact with the walls of the evaporation chamber.

Figure 3:
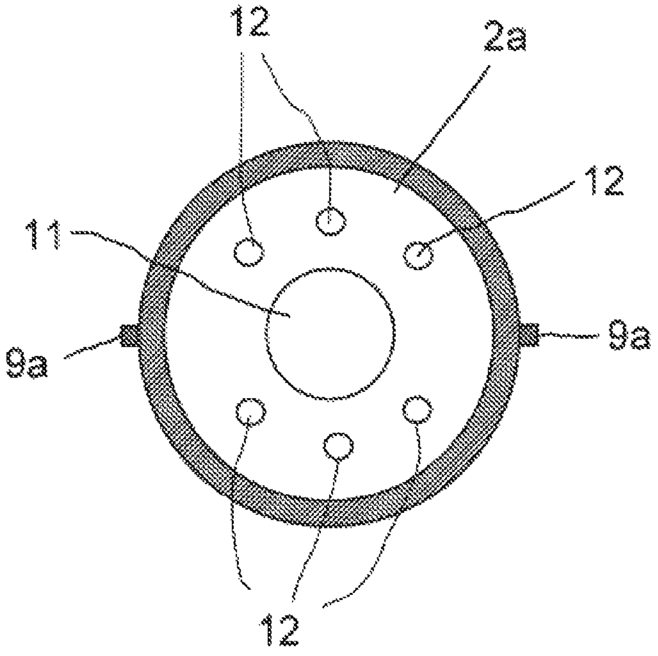
FIG. 3 is a top view of an intermediate bottom of an evaporator according to one embodiment.

According to a preferred embodiment, the liquid is sprayed by means of a carrier gas. The presence of the carrier gas causes a reduction in the dew point. When a carrier gas is used, use is, preferably, made of a two-substance nozzle such as it is schematically shown in FIGS. 1 and 3.

According to one embodiment of the invention, use is, preferably, made of pneumatic atomizing nozzles. When pneumatic atomizing nozzles are used, the supply of gas serves to additionally tear up the liquid flow to form ultra-fine droplets. Use can be made of injector nozzles or, preferably, of pressure mixing nozzles.

When injector nozzles are used, the liquid and the gas are mixed by one medium acting as blowing medium and the second medium aspirating into the mixing chamber (according to the Venturi principle). Both media leave the nozzle as a mixture.

When pressure mixing nozzles are used, both media, i.e. gas and liquid, are supplied to the nozzle in a pressurised manner (liquid pressure principle).

When pressure mixing nozzles are used, the media can be mixed either within or without the nozzle body. In case of internally mixing nozzles, both media are mixed in a mixing chamber. The mixture leaves the nozzle opening, e.g., as a hollow cone. In case of externally mixing nozzles, the two media do not meet before they have exited from the nozzle. Mixing is caused by spraying the two spray cones into each other.

Externally mixing nozzles are particularly adapted to atomize viscous media tending to contaminate and are, therefore, preferred. Moreover, externally mixing nozzles are to advantage in that the media supplies do not mutually affect each other. Preferably, use is made of an externally mixing two-substance nozzle which comprises a plurality of discharge openings that are arranged in the form of a ring.

In general, nozzles with a cone-shaped form of spraying are preferred, more particularly with a full-cone form of spraying.

Figure 4:
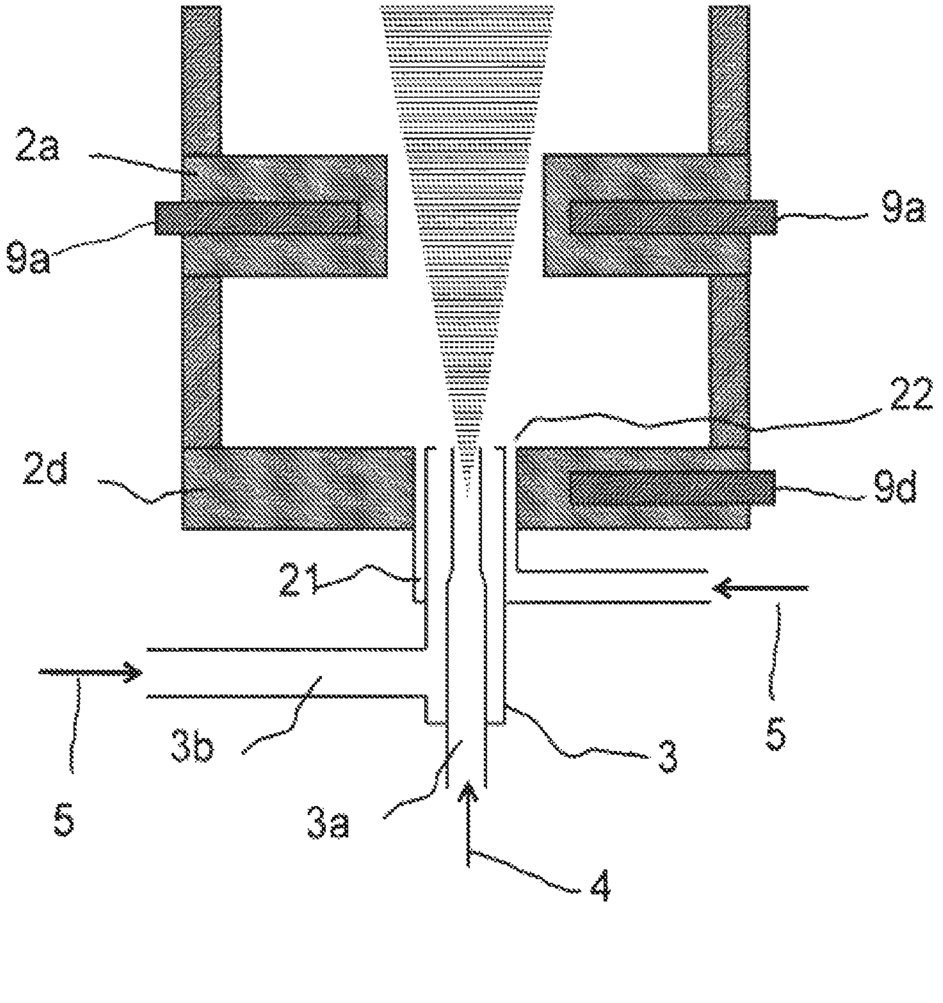
FIG. 4 is a sectional view of the bottom area of an evaporator according to one embodiment.

In order to improve the stirring and spraying of sump residues, one or more further nozzles 21 can be provided (FIG. 4). For example, the atomizing nozzle 3 can be surrounded by a further annular nozzle or a rim of nozzles which are used to introduce the carrier gas. Preferably, this nozzle or these nozzles is/are arranged in an annular recess. Since mobile residues, preferably, accumulate in recesses, it is, in this manner, possible to specifically stir up and spray sump residues. The annular arrangement of the discharge openings is to advantage in that the sump residues are carried along and sprayed by the external gas flow without impairing the spraying of the starting material through the internal nozzles.

When a plurality of nozzles or multiple-substance nozzles are used, use is, preferably, made of at least 20% and, more preferably, of at least 50% of the carrier gas introduced into the evaporator for atomizing the liquid. The remaining carrier gas can be used for stirring up the sump material.

In order to accelerate evaporation, the feed material is, preferably, preheated. The temperature depends on the feed material and, in case of OMCTS, is preferably within a range from 60° C. to 175° C., more preferably from 100° C. to 160° C.

Preferably, the carrier gas is heated up to a temperature from 100° C. to 250° C., more preferably from 130° C. to 240° C., and most preferably from 150° C. to 220° C.

Preferably, the evaporator itself is also heated. This can be achieved by means of heater elements in the walls and/or bottoms of the evaporator or by means of heater elements inserted into the evaporator chamber. For heating purposes, use can be made of heated fluids, e.g.

heated liquids or, preferably, electric heater elements. The heating is, preferably, above all and, most preferably, exclusively achieved via the bottoms, i.e. the bottom plate **2*d*, the cover 2*e*** and/or the optional intermediate bottoms, wherein electrically heated bottoms are particularly suitable.

Preferably, at least 80% of the heater output are introduced via the bottoms. Preferably, no more than 20% of the heater output are introduced via the lateral surface wherein, preferably, the lateral surface should not be additionally heated.

Figure 2:
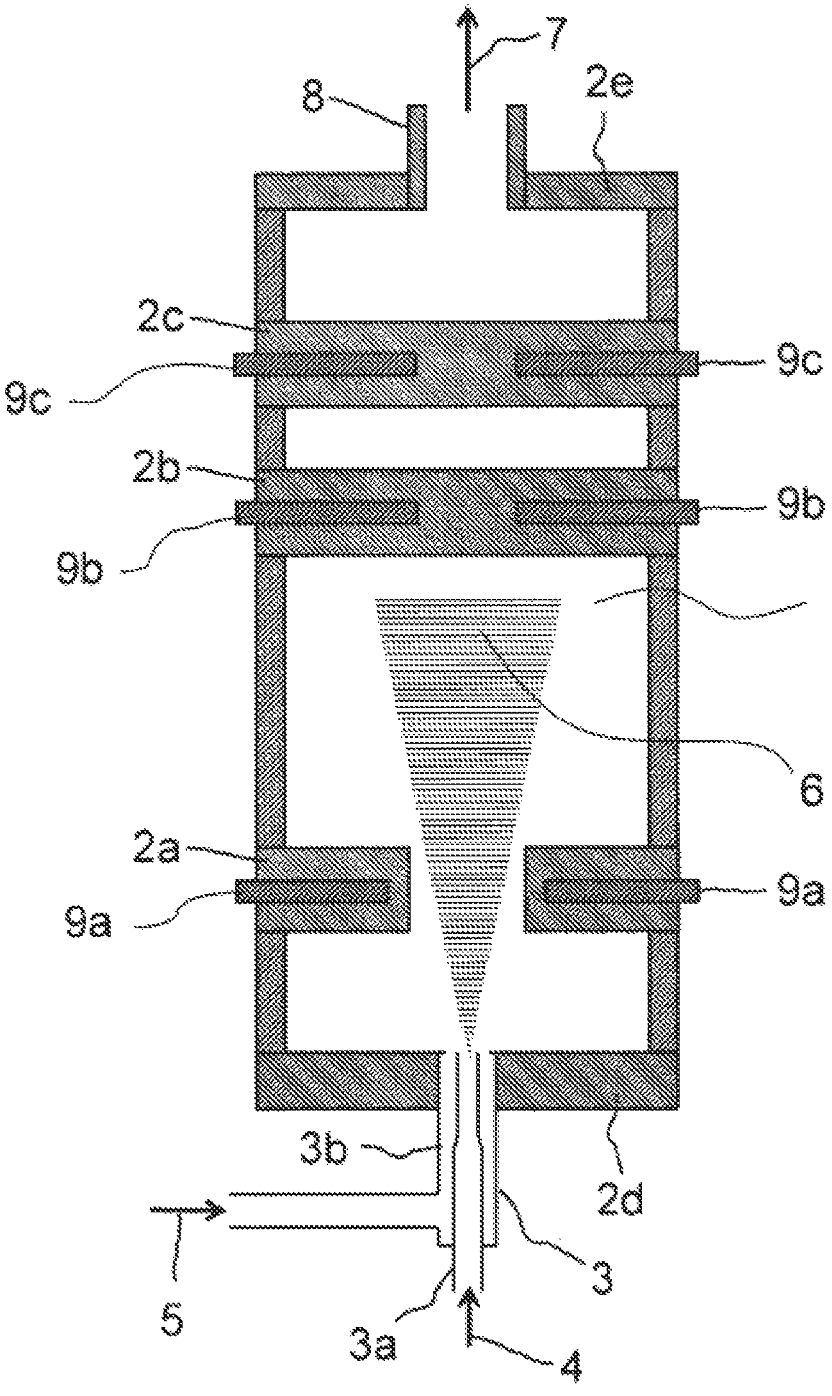
FIG. 2 is a sectional view of an alternative embodiment of an evaporator according to one embodiment.

FIG. 2 shows a preferred embodiment of the evaporator according to one embodiment of the invention which comprises three heatable intermediate bottoms **2*a*, 2*b* and 2*c* in addition to the bottom plate 2*d* and the cover 2*e*. Preferably, the evaporator comprises at least one and, more preferably, 2 to 10 and, most preferably, 3 to 6 heatable intermediate bottoms. The intermediate bottoms are each provided with heater elements 9*a*, 9*b* and 9*c* via which the bottoms can be electrically heated. The spray mist exiting from the nozzle 3 is sprayed through the central opening of the first intermediate bottom 2*a* and into the open internal space 2*f***.

The intermediate bottoms **2*a*, 2*b* and 2*c* comprise one or more openings in order to ensure that the vapour can be discharged in an upward direction and condensate and other deposits can be drained in a downward direction. FIG. 3 is a top view of the intermediate bottom 2*a*. In addition to the central opening 11, the bottom has additional holes 12** through which the discharging of deposits is facilitated.

The bottom of the evaporator can be designed in various manners. For example, the evaporator can comprise a bottom plate with a conically lowered inner surface or a flat inner surface.

FIG. 4 is an enlarged view of the bottom area of an evaporator according to one embodiment of the invention having a flat inner bottom surface. In this embodiment, the bottom plate **2*d* also contains at least one heater element 9*d*. The injection nozzle 3** is a two-substance nozzle.

The alkyl polysiloxane is supplied to the nozzle via the inlet **3*a* and the carrier gas via the inlet 3*b*. In addition, a further nozzle 21 is provided via which the carrier gas can be supplied into the evaporator. The carrier gas enters the evaporator via opening(s) 22 which are arranged in the form of a ring around the outlet of the two-substance nozzle 3**.

Figure 5:
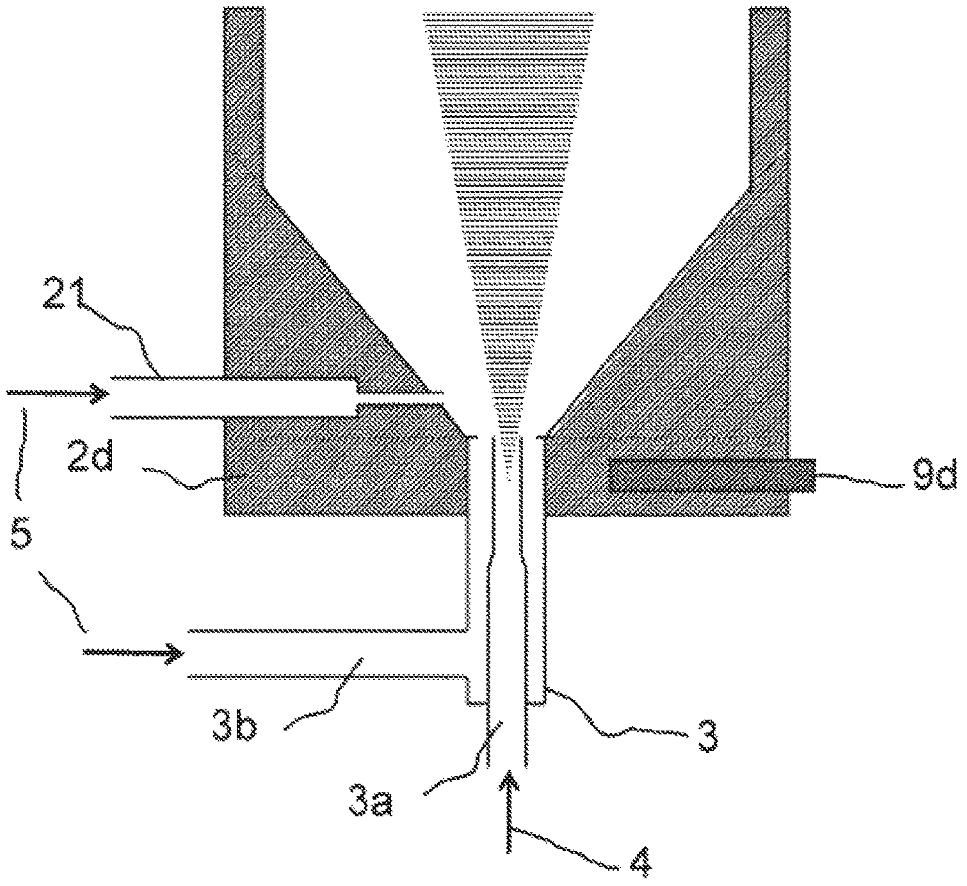
FIG. 5 is a sectional view of an alternatively designed bottom area of an evaporator according to one embodiment.

FIG. 5 shows a further embodiment of the bottom plate **2*d* with a heater element 9*d* of an evaporator according to one embodiment of the invention. The bottom plate comprises a cone-shaped cavity through which condensate and gel-like products are collected. They flow to the injection nozzle 3 where they are carried along by the incoming gas flow. The nozzle 21** can be used to introduce additional carrier gas in order to stir up the sump products.

The invention claimed is:

1. A method of manufacturing quartz glass comprising:

evaporating an appropriate liquid starting material capable of being vaporized and oxidized to form $SiO_2$ by spraying it into a vertically arranged evaporation chamber;

oxidizing the evaporated appropriate liquid starting material to form $SiO_2$; and collecting the $SiO_2$;

characterized in that the appropriate liquid starting material to be evaporated is sprayed in at a bottom of the evaporation chamber and the evaporated appropriate liquid starting material is removed at the top end of the evaporation chamber, wherein the evaporation chamber is designed such that components depositing in the evaporation chamber accumulate on the bottom of the evaporation chamber and are repeatedly sprayed again by an inflowing gas flow in the form of droplets so that the vaporizable contents of the deposited components are evaporated and components that do not evaporate polymerize to form a high-viscosity polymer layer having a thickness of less than 70 μm on walls and the bottoms of the evaporation chamber and wherein the components that do not evaporate do not form a sump.

2. The method of claim 1, wherein the collected $SiO_2$ is dried; and subjected to a heat treatment to form a glass blank.

3. The method of claim 1, wherein a polymethyl cyclosiloxane is used as an appropriate liquid starting material.

4. The method of claim 3, wherein one of hexamethyl cyclotrisiloxane, octamethyl cyclotetrasiloxane, decamethyl cyclopentasiloxane and dodecamethyl cyclohexasiloxane is used as polymethyl cyclosiloxane.

5. The method of claim 1, wherein the temperature in the evaporation chamber is within a range from 130° C. to 230° C.

6. The method of claim 1, wherein the appropriate liquid starting material is introduced into the evaporation chamber along with a carrier gas.

7. The method of claim 6, wherein an inert gas is used as the carrier gas.

8. The method of claim 6, wherein the molar ratio of the appropriate liquid starting material to carrier gas is within a range from 0.01 to 2.

9. The method of claim 1, wherein the evaporated appropriate liquid starting material is mixed with oxygen.

10. The method of claim 9, wherein the evaporated appropriate liquid starting material mixed with oxygen is introduced into a burner where it is burned, forming $SiO_2$.

11. The method of claim 10, wherein an appropriate combustion fuel is additionally introduced into the burner.

12. The method of claim 11, wherein hydrogen is used as the appropriate combustion fuel.

13. The method of claim 6, wherein the appropriate liquid starting material and the carrier gas are introduced into the evaporation chamber through a two-substance nozzle.

14. The method of claim 13, wherein the two-substance nozzle is a pressure mixing nozzle.

15. The method of claim 14, wherein the pressure mixing nozzle is an externally mixing nozzle.

16. The method of claims 13, wherein the two-substance nozzle comprises discharge openings that are arranged in the form of a ring.

17. The method of claim 16, wherein the discharge openings of the two-substance nozzle are surrounded by a further annular nozzle or a rim of nozzles which are used to introduce the carrier gas.

* * * * *